June 25, 1929.  M. P. GRAHAM  1,718,229
HARDENED BALL SEAT AND PROCESS OF MAKING SAME
Filed April 11, 1927
Fig. 1
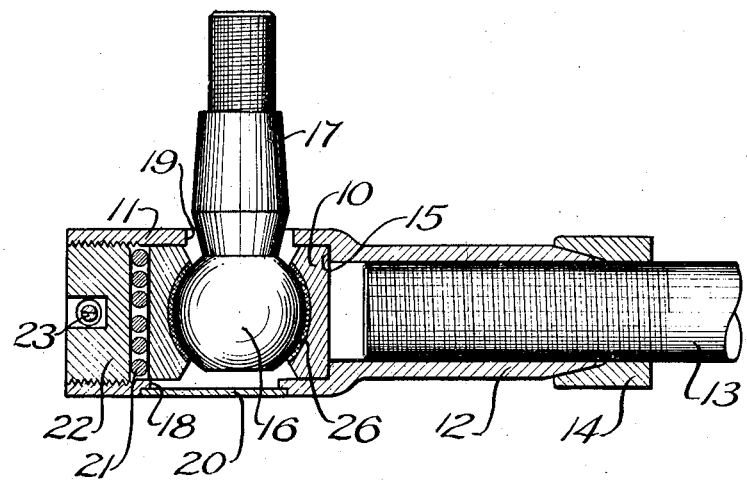
Fig. 2  Fig. 3  Fig. 4
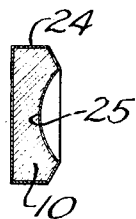 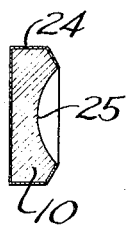 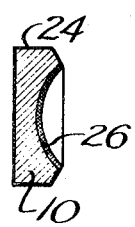
Inventor
Mathew P. Graham
by Charles W. Hills
Attys.

Patented June 25, 1929.

1,718,229

UNITED STATES PATENT OFFICE.

MATTHEW P. GRAHAM, OF DETROIT, MICHIGAN, ASSIGNOR TO THOMPSON PRODUCTS INC., OF CLEVELAND, OHIO, A CORPORATION OF OHIO.

HARDENED BALL SEAT AND PROCESS OF MAKING SAME.

Application filed April 11, 1927. Serial No. 182,755.

This invention relates to the process of producing ball seat bearings, such as used in the ball joint connections used for the tie rods and drag links in the steering linkage of vehicles.

It is an object of this invention to provide an improved process for producing improved ball seat members for use in ball joint connections, the process comprising protecting non-bearing surfaces of the member, with a plating of copper to avoid case hardening thereof and to then case harden the non-protected bearing surface, suitable heat treatment producing an improved ball seat member having a soft and tough core with a hardened bearing surface.

Other and further important objects of this invention will be apparent from the disclosures in the specification and the accompanying drawings.

This invention (in a preferred form) is illustrated in the drawings and hereinafter more fully described.

On the drawings:

Figure 1 is a section of a ball joint connection illustrating the use of the improved ball seat members produced by the process of this invention.

Figure 2 is a section of a ball seat member after copper-plating all over.

Figure 3 is a section similar to Figure 2 showing the copper plate removed from the bearing surface.

Figure 4 is a section of the completed ball seat member after case hardening.

As shown on the drawings:

The ball seat members 10 form part of a ball joint assembly such as is shown in Figure 1, the assembly comprising a cylindrical sleeve 11 having an extension 12 of reduced diameter which is internally threaded to receive the threaded end of a tie rod 13, a lock nut 14 being used to preserve the position of the extension. An internal shoulder 15 is produced by the reduced diameter of the extension 12, this shoulder forming a seat for one of the ball seat members 10. A spherical ball 16 with an integral stem 17 is inserted through a bottom aperture 18 in the sleeve 11, the stem projecting through a top aperture 19, After inserting the ball and stem, the bottom aperture is sealed by a welded-in cover 20, thus preventing disconnection of the joint. The second ball seat member is inserted through the open end of the sleeve and backed up by a helical spring 21 of conical form which is compressed into spiral form by a threaded plug 22 screwed into the open end of the sleeve, this plug being retained in position by a cotter pin 23.

The process of producing the ball seat members 10 comprises forging or machining blanks of steel suitable for case hardening, then either copper-plating the entire blank as indicated at 24 in Figure 2 and removing the plate from the ball seat bearing surface 25, as shown in Figure 3, or protecting the surface 25 with a non-conducting coating before plating the remaining surfaces, thus producing the blank of Figure 3 directly. In either case, the blank shown in Figure 3 is then packed in a carburizing compound and case-hardened, as indicated at 26 in Figure 4, the copper plate preventing the entry of carbon on the non-bearing surfaces. After carburizing, suitable heat treatment produces the final case hardened bearing surface with a soft and tough core.

It will thus be seen that I have produced an improved ball seat member by an improved process, resulting in a tough body with a hard bearing surface that will resist wear without danger of cracking as would be the case if the entire ball seat member were hardened.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

As a new article of manufacture, a ball seat member for ball joint connections having a case-hardened bearing surface with a soft core and back.

In testimony whereof I have hereunto subscribed my name at Detroit, Wayne County, Michigan.

MATTHEW P. GRAHAM.